United States Patent [19]
Watanabe et al.

[11] Patent Number: 5,213,166
[45] Date of Patent: May 25, 1993

[54] PILE DRIVING AND PILE REMOVING METHOD

[75] Inventors: Naotaka Watanabe; Hiroshi Itoda, both of Tokyo; Akio Kitamura, Kochi, all of Japan

[73] Assignee: Mitsui-Cyanamid, Ltd., Tokyo, Japan

[21] Appl. No.: 831,733

[22] Filed: Feb. 10, 1992

Related U.S. Application Data

[63] Continuation of Ser. No. 448,869, Dec. 12, 1989, abandoned.

[51] Int. Cl.$^5$ .................... B25D 17/26; C09K 7/00
[52] U.S. Cl. .......................................... 173/1; 175/65; 252/49.5
[58] Field of Search .............. 173/1; 175/65, 66; 405/274–281; 252/49.5

[56] References Cited

U.S. PATENT DOCUMENTS

| | | | |
|---|---|---|---|
| 3,688,509 | 9/1972 | Van Weele | 405/281 |
| 4,361,452 | 11/1982 | Clarke et al. | 156/71 |
| 4,443,576 | 4/1984 | Bhattacharyya et al. | 524/522 |
| 4,547,298 | 10/1985 | Novak | 175/65 |
| 4,629,575 | 12/1986 | Weibel | 175/65 |
| 4,671,883 | 6/1987 | Connell et al. | 175/65 |
| 4,709,767 | 12/1987 | Alexander | 175/65 |
| 4,716,974 | 1/1988 | Radford et al. | 175/65 |
| 4,808,324 | 2/1989 | Périard et al. | 252/49.5 |
| 4,846,986 | 7/1989 | Trivett | 252/49.5 |
| 4,867,256 | 9/1989 | Snead | 175/65 |
| 4,921,621 | 5/1990 | Costello et al. | 175/65 |
| 4,995,995 | 2/1991 | Garvey et al. | 252/49.5 |

Primary Examiner—Frank T. Yost
Assistant Examiner—Scott A. Smith
Attorney, Agent, or Firm—Wenderoth, Lind & Ponack

[57] ABSTRACT

A pile driving and pile removing method comprises the step of causing a water-in-oil type water swellable polymer particle emulsion to be present on the pile surface or in the vicinity thereof during driving or extraction. The presence of the emulsion reduces the frictional resistance between the pile and the ground, enabling smooth and easy driving and removing of the pile.

4 Claims, 6 Drawing Sheets

PILE DRIVING AND PILE REMOVING METHOD

This application is a continuation of now abandoned Ser. No. 448,869, filed Dec. 12, 1989

BACKGROUND OF THE INVENTION

1. Field of the Invention

This invention relates to a pile driving and pile removing method and more particularly to such a method in which the resistance at the time of pile driving or pile removing is reduced by causing a chemical agent to be present on the pile surface or in the vicinity thereof.

2. Description of the Background Art

As conventional methods for reducing resistance at the time of driving/removing a steel pipe pile or the like into/from the ground, it has been known to spray water onto the pile surface or, during pile driving, to jet water into the ground from a jet pipe attached to the tip of the pile.

These methods are sometimes difficult to implement because it may be hard to secure the large amounts of water required and, when the water is available, the ground may be weakened by the large quantity of water injected.

Further, dirt may adhere to the web of the pile during removal so that a hole remains in the ground after the pile is extracted. This amounts to a form of secondary environmental pollution.

On the other hand, in the shielded pile driving method it is known to use a chemical agent for reducing the frictional resistance at the outer surface of the tunneling pipe. The liquid substance used is, as disclosed for example in Japanese Patent Public Disclosure No. 58(1983)-27774, initially a water absorbent high polymer in the form of dry spheres. Injection of the agent at time of pile driving is thus troublesome. The injected agent absorbs water and becomes a gel, but the time required for this reaction is disadvantageously long.

SUMMARY OF THE INVENTION

One object of the present invention is to overcome the drawbacks of the background art methods by providing a pile driving and pile removing method in which a water-in-oil type water swellable polymer particle emulsion or a water dispersion thereof is caused to be present on the pile surface or in the vicinity thereof and the pile is then driven into the ground by a pile driver. This method increases the efficiency of pile driving and pile removing by, for example, reducing the frictional resistance at the pile surface and enhancing the water barrier effect.

In the method of this invention, a pile having its surface coated with water-in-oil type water swellable polymer particle emulsion or a water dispersion thereof is driven into the ground using a pile driver. The coating of this agent on the surface of the pile reduces the surface frictional resistance of the pile at the time it is driven into the ground so that the pile can be driven smoothly even after it has reached a considerable depth.

As the surface frictional resistance is also reduced during pile removal, the pile can be quickly removed with small force and with little adherence of dirt thereto, thus making it possible to avoid secondary environmental pollution.

These effects are presumed to derive from the fact that the particles of the coating are minute spheres which can easily slip and be displaced with respect to each other and the fact that small oil droplets formed together with the minute spheres work synergistically with the spheres to increase the lubricating effect.

Further, the emulsion coating the grips of the pile rapidly assumes a gelled state upon absorption of water and thus manifests a water barrier effect. The agent of the present invention absorbs water and swells in a short time after coming into contact with water. It also has high water retentivity and releases almost none of the water it has absorbed even under a fairly high pressure. The agent is amenable to conveyance by pumping, can be smoothly injected into the ground, and can be easily impregnated into non-woven cloth, paper and the like.

DESCRIPTION OF THE PREFERRED EMBODIMENT

Figure 1:
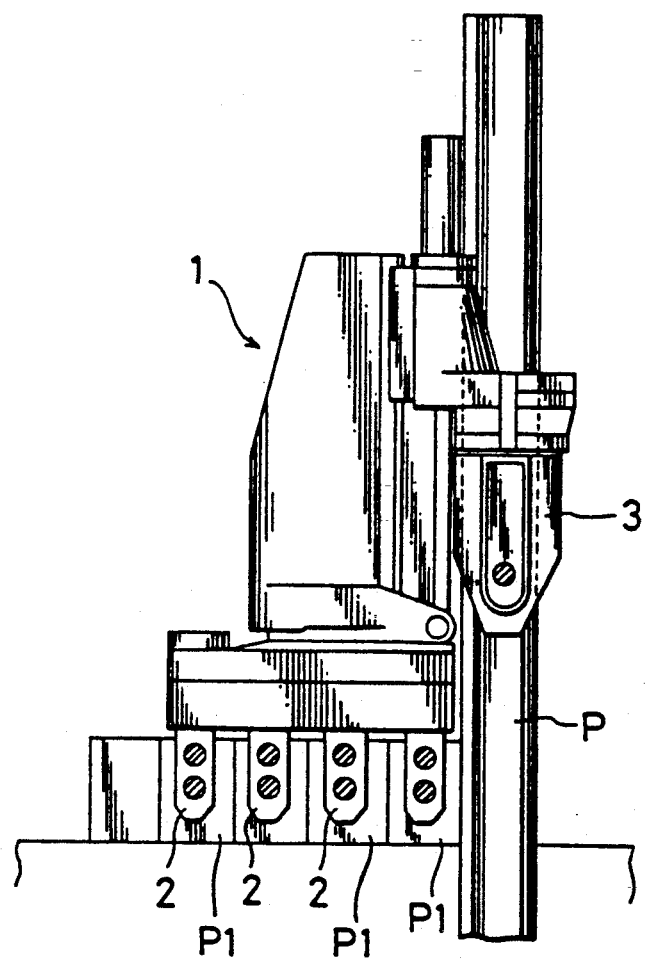
FIG. 1 is a front view showing a pile being driven into the ground.

The water-in-oil type water-swelling polymer emulsion contains polymer particles formed by preparing an aqueous solution of a water-soluble vinyl monomer and a crosslinkable monomer, dispersing the aqueous solution in an organic dispersive medium by use of a hydrophobic surface active agent, and allowing a radical polymerization reaction to proceed between the vinyl monomer and the crosslinkable monomer.

It may otherwise be a water-in-oil type emulsion produced by the water-in-oil type suspension polymerization method or the emulsion polymerization method. Alternatively, it may be a dispersion obtained by dispersing a finely comminuted powder in an organic dispersive medium in the presence of a surface active agent and/or a stabilizer. In short, it suffices for it to be a water-in-oil type emulsion or an emulsion-like substance.

As the water soluble vinyl monomer there can be used (1) nonionic vinyl monomer, (2) anionic vinyl monomer and (3) cationic vinyl monomer.

Among usable nonionic vinyl monomers (1) can be mentioned acrylamide, methacrylamide, vinylmethylether, vinylethylether, vinylpyrolidone and the like.

As the anionic vinyl monomer (2), there can be used acrylic acid, methacrylic acid, 2-acrylamide-2-methylpropanesulfonic acid, vinylsulfonic acid, styrene sulfonic acid, itaconic acid, maleic acid, fumaric acid, arylsulfonic acid and the like.

As the cationic vinyl monomer (3), there can be used, for example, (a) neutral salts or quaternary ammonium salts of dialkylaminoalkyl methacrylates or acrylates such as dimethylaminoethyl acrylate, dimethylaminoethyl methacrylate, diethylaminoethyl acrylate and diethylaminoethyl methacrylate, and (b) dialkylaminoalkyl methacrylates or acrylamides such as dimethylaminomethyl acrylamide, dimetholaminoethyl methacrylate, dimethylaminopropyl acrylamide and dimethylaminopropyl methacrylamide.

As the crosslinkable monomer there is used one which is capable of copolymerization with water soluble vinyl monomer. Specific examples are such divinyl compounds as N,N'-methylenebis acrylamide, N,N'-methylenebis methacrylamide, divinylbenzen, vinyl acrylate, and vinyl methacrylate, such vinyl type methylol compounds as methylol acrlylamide and methylol methacrylamide, such vinylaldehyde compounds as acrolein, and also methylacrylamide, glycolatemethylether and the like.

The properties of the emulsion obtained in the aforementioned manner will now be explained. The emulsion is produced by preparing an aqueous solution of one or more water soluble vinyl monomers and a crosslinkable monomer, dispersing the aqueous solution in an organic dispersive medium using a hydrophobic surface active agent and thereafter allowing radical polymerization reaction to proceed. It is composed of 25-75 wt % polymer particles, 20-50 wt % organic dispersive medium, 0.5-5 wt % hydrophobic surface active agent (preferably at an HLB (hydrophilic-lipophilic balance) of 3-6), and 0-5 wt % hydrophilic surface active agent (preferably at an HLB of not less than 10).

The polymer particles of the emulsion prepared in this manner have a mean diameter of not more than 10 $\mu$m and in particular include particles having a mean diameter of 2-6 m. The emulsion has a viscosity of about 300-800 cps and can be used either as it is or as a water dispersion thereof. In the latter case, the dispersion ratio is on the order of 0.5-2 wt %.

After the emulsion has been prepared in the foregoing manner, it is coated on the surface of the pile. This can be accomplished, for example, by brush application, spray coating, dipping or a like method, and the coating may be partial or extend to the over the entire surface of the pile.

Alternatively, the emulsion can be impregnated into non-woven cloth or paper which is thereafter adhered to the pile surface. It is further possible to cause the emulsion to be present on the pile surface at the time of driving the pile by injecting it into the ground either together with the pile or prior to driving of the pile.

EXAMPLES

Examples of preparing the water-in-oil type water swellable polymer particle emulsion according to this invention will first be given.

PREPARATION EXAMPLE 1

18 g of sorbitanmonooleate (HLB: 4.3) was added to 0.15 g of N,N'-methylenebisacrylamide, 683 g of a 54% aqueous solution of 100 mole % ammonia neutralized acrylic acid and 240 g by weight of an organic dispersive medium, and the mixture was emulsified in a homogenizer.

The resulting emulsion was transferred to a four-mouth flask and, under stirring, was purged of air using $N_2$ gas. Concurrently with the $N_2$ gas purging, a radical polymerization catalyst was added to the emulsion dropwise and polymerization was carried out at 60° C.

Upon completion of the polymerization, 27 g of polyoxyethylenelaurylether (HLB: 12.1) was added with stirring. The viscosity of the so-obtained emulsion was found to be 330 cps/25° C. (measured by a B-type viscometer, No. 2 rotator, 12 rpm) and the mean particle diameter was 3.8 $\mu$m.

PREPARATION EXAMPLE 2

An emulsion was prepared in a manner similar to Preparation Example 1 except that 0.07 g of vinyl acrylate was used as the crosslinkable monomer, 537 g of a 41.6% aqueous solution of acrylamide was used as the water soluble vinyl monomer, the amount of organic dispersive medium used was 196 g, the amount of hydrophobic surface active agent (HLB: 4.3) used was 14 g, and the amount of hydrophilic surface active agent (HLB: 12.1) used was 23 g. The so-obtained emulsion exhibited a viscosity of 310 cps/25° C. (measured by a B-type viscometer, No. 2 rotator, 12 rpm) and a mean particle diameter of 3.3 $\mu$m.

PREPARATION EXAMPLE 3

An emulsion was prepared in a manner similar to Preparation Example 1 except that 0.09 g of vinyl methacrylate was used as the crosslinkable monomer, 619 g of a 51% aqueous solution of the quaternary ammonium methyl chloride salt of dimethylaminoethylmethacrylate was used as the water soluble vinyl monomer, the amount of organic dispersive medium used was 224 g, the amount of hydrophobic surface active agent (HLB: 4.3) used was 14 g, and the amount of hydrophilic surface active agent (HLB: 12.1) used was 25 g. The so-obtained emulsion exhibited a viscosity of 530 cps/25° C. (measured by a B-type viscometer, No. 2 rotator, 12 rpm) and a mean particle diameter of 5.1 $\mu$m.

PREPARATION EXAMPLE 4

A dispersion was prepared by dispersing 1 l of the emulsion according to Preparation Example 1 in 100 l of water.

The pile driving method using the emulsion of the present invention prepare above will be explained hereinafter according to the drawings.

FIG. 1 is a front view showing a pile being driven into the ground by a pile driver and extractor.

This pile driver/extractor 1 is a conventional static-load type machine having a chuck 3 for clamping a pile at the forward end thereof. The pile driver/extractor 1 has clamps 2 at the lower end thereof for clamping previously driven piles P1 and thus fixing itself on the sunk piles P1. The pile driver/extractor thus obtaines the force of reaction arising when the pile driver/extractor 1 drives in the next pile P from the sunk piles P1.

Figure 2A:
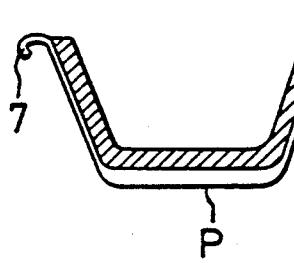
FIG. 2 is a plan view showing U-section steel sheet piles coated with emulsion.
Figure 2B:
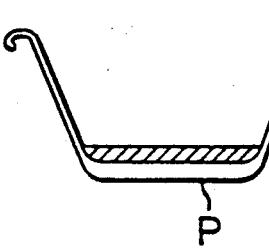
Figure 2C:
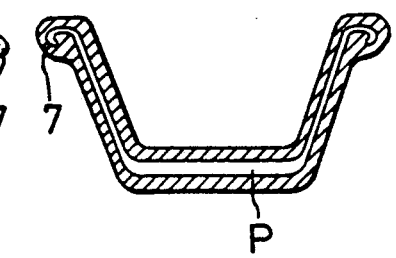

The surface of the pile P is provided in advance with a coating of the emulsion of this invention by brush application, spray coating, dipping or other appropriate method. The mode of coating with the emulsion can be selected in consideration of the length of the pile P to be driven, the ground conditions and other work circumstances from among, for example, those shown in FIG. 2: (a) coating over the entire web, (b) coating over only the bottom of the web, or (c) coating over the entire surface.

Figure 3:
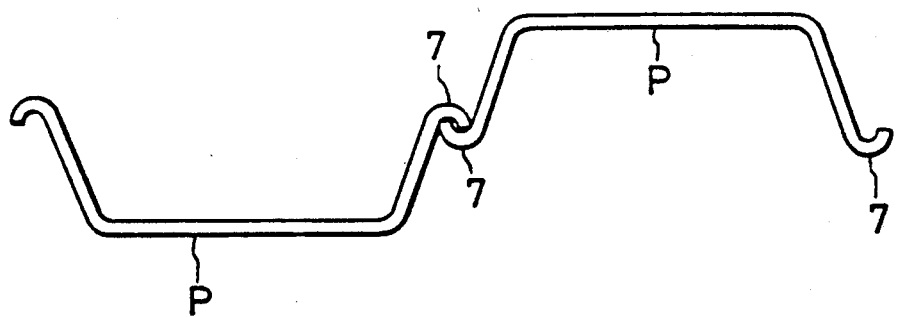
FIG. 3 is a plan view showing the interlocking arrangement of the grips of U-section steel sheet piles.
Figure 4:
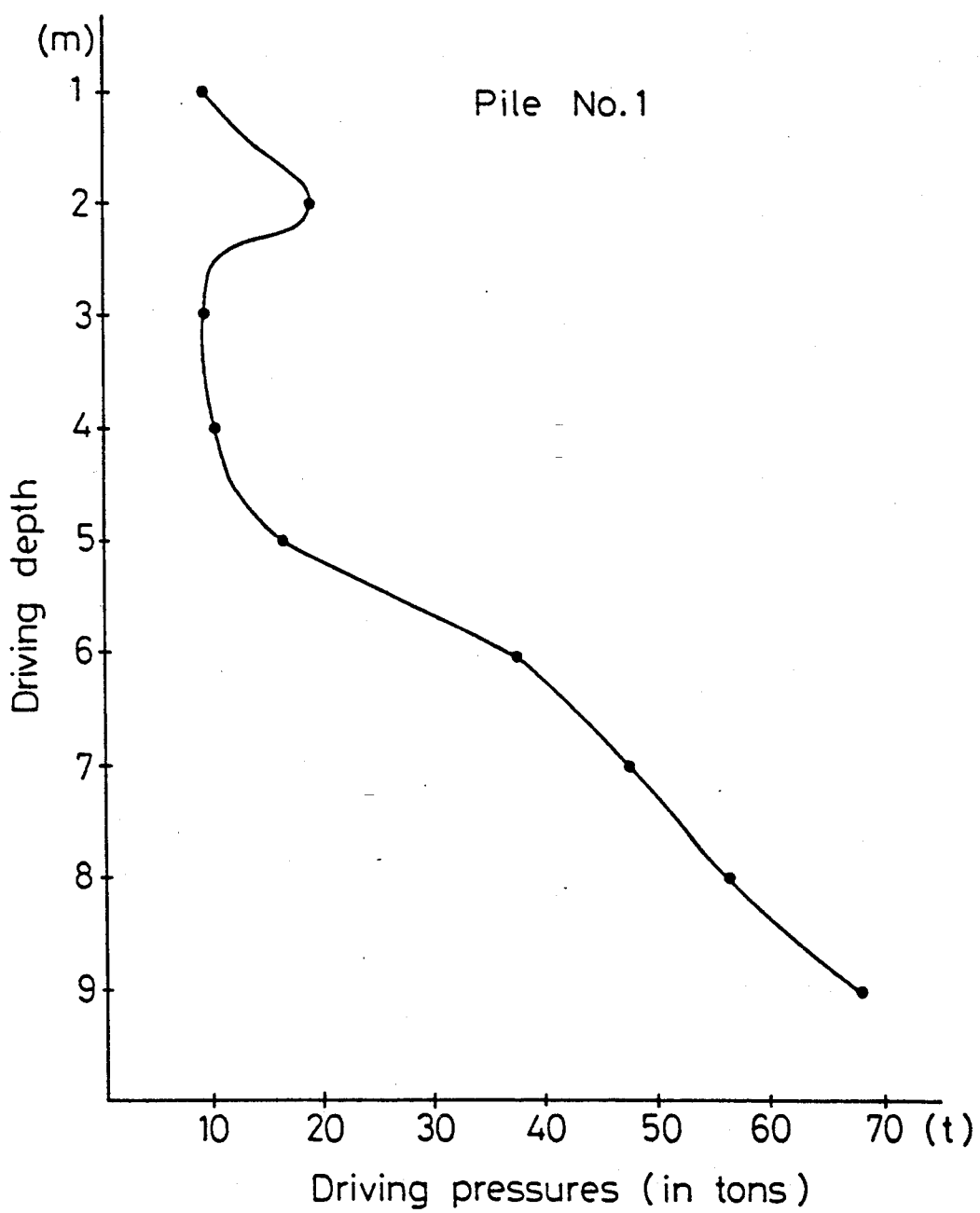
FIGS. 4 to 7 are graphs showing the effect of the present invention in terms of the relationship between driving pressure and driving depth for sheet piles which are embodiments of the present invention.
Figure 5:
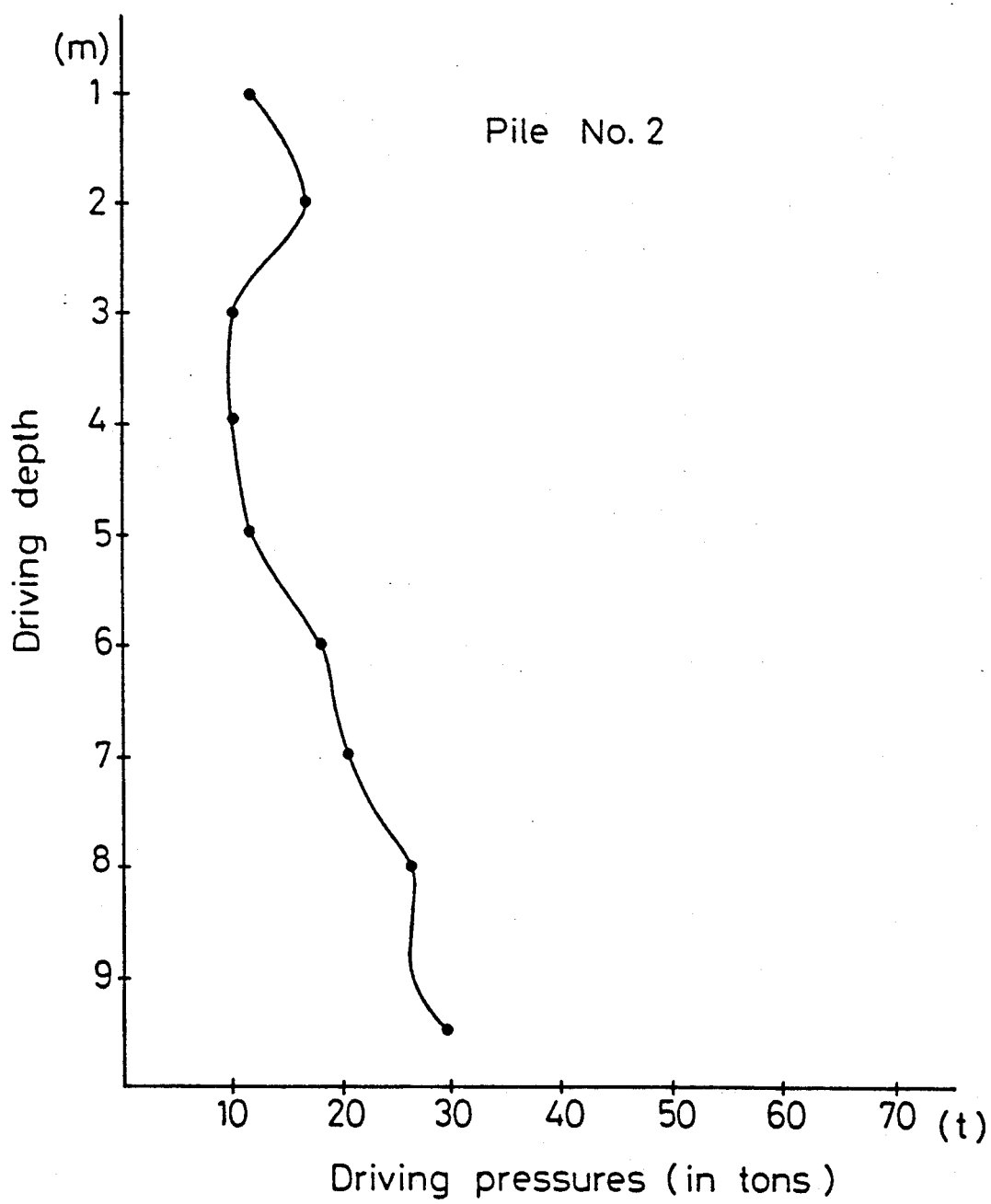
Figure 6:
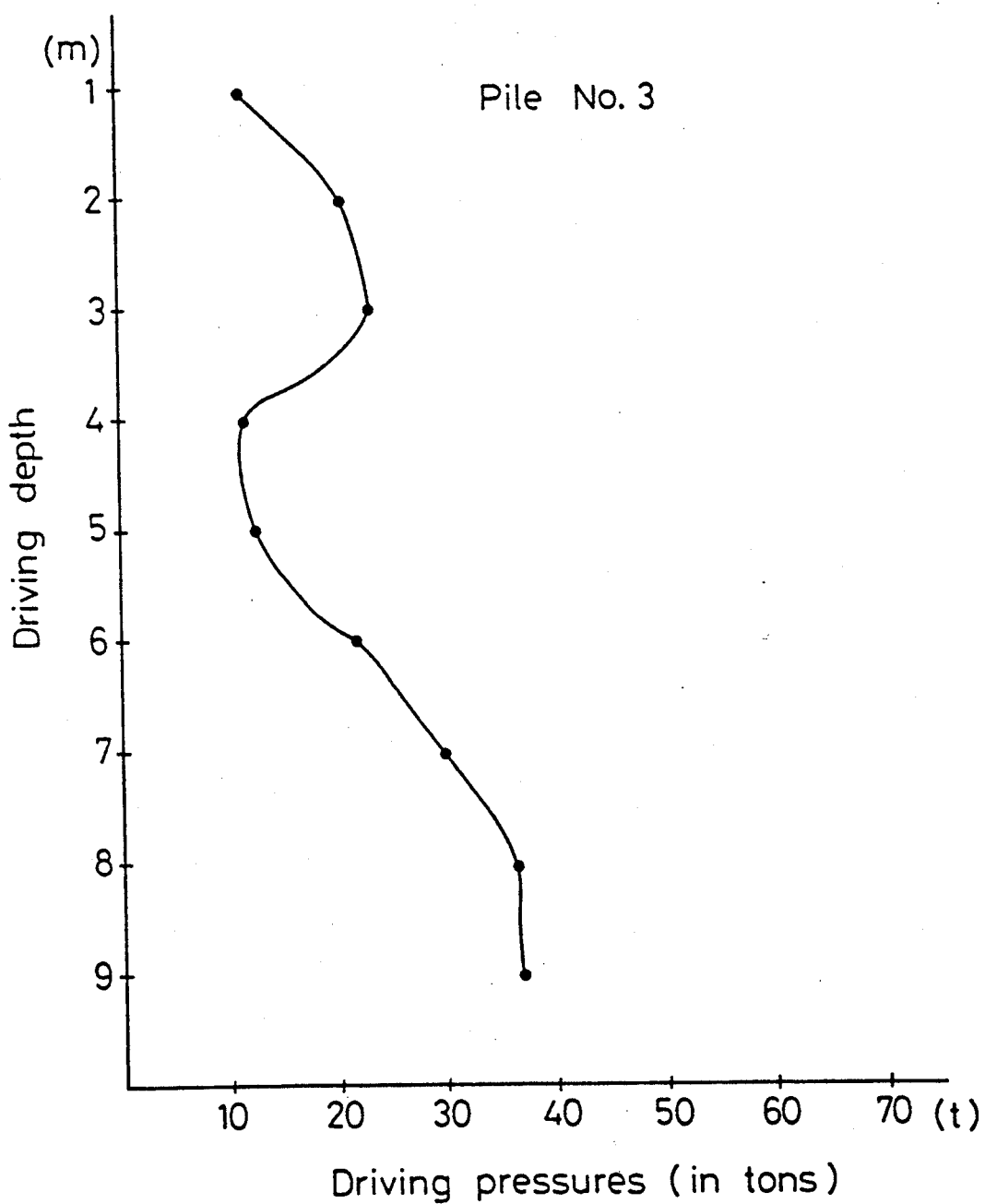
Figure 7:
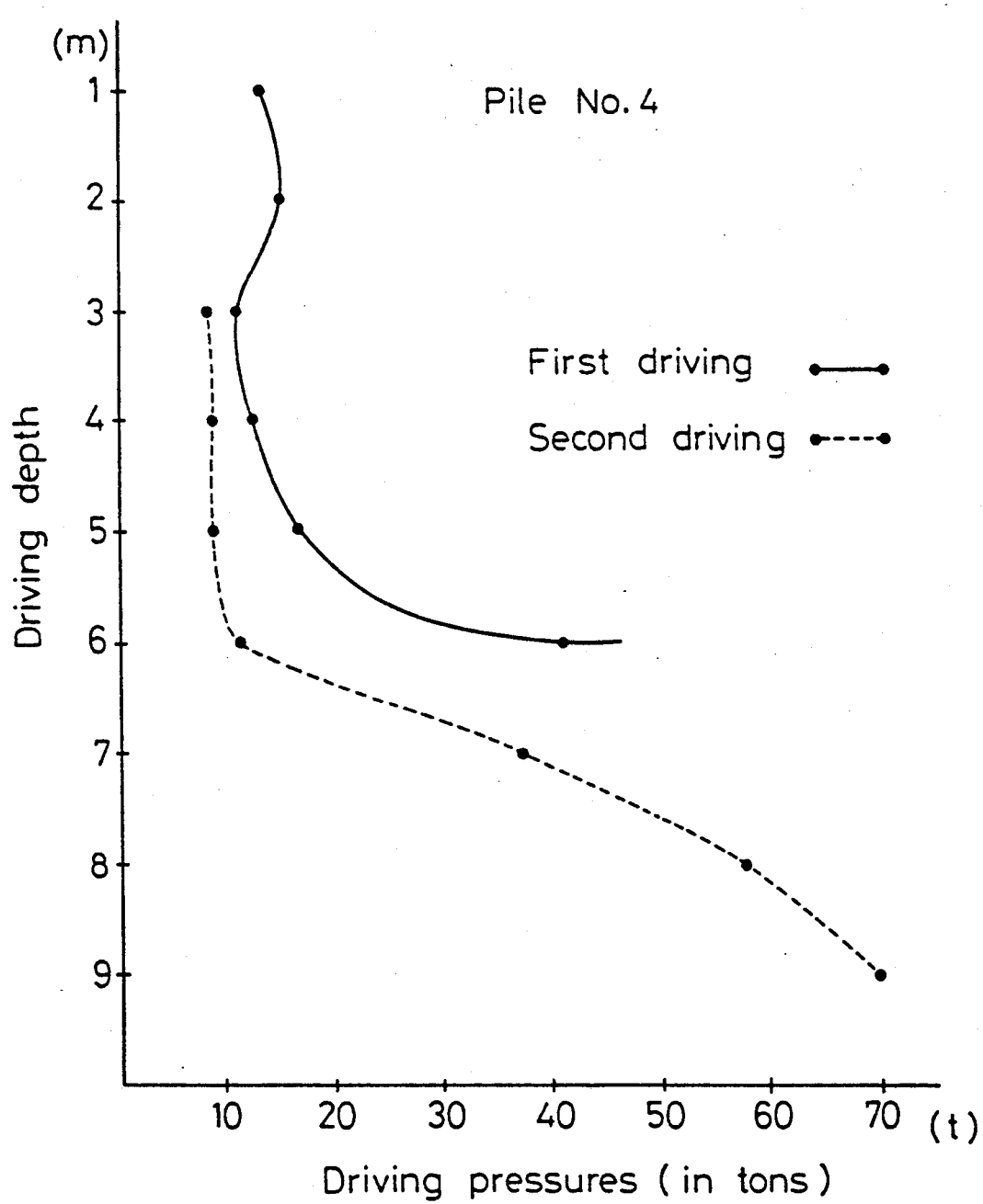

For driving the pile P coated with emulsion in one of the foregoing ways into the ground, the chuck 3 of the pile driver/extractor 1 clamps the pile P, brings one grip 7 of the pile P into engagement with a grip of the leading one of the already driven piles P1 (see FIG. 3), and lowers the chuck 3 for driving the pile P into the ground.

At this time, since the surface of the pile P is coated with a layer of the emulsion, the surface frictional resistance of the pile P is reduced, enabling the pile to be sunk vertically and quickly.

As the pile P is being driven, the emulsion layer formed on its surface rapidly absorbs water from the ground and assumes a gelled state. This further reduces the frictional resistance between the pile P and the earth. Depending on the ground conditions and the like, the surface of the pile P can be wetted with water in advance of driving. Alternately, water can be pumped into the ground surface through a pipe at the position of the pile or in the vicinity thereof.

The emulsion on the surface of the pile P also serves to reduce the frictional resistance at the time of extracting the pile. In particular, the adherence of a large amount of dirt to the web that has occurred in the past can be prevented, making it possible to prevent formation of a hole around the pile as it is extracted.

Since the emulsion coated on the grips 7 of the piles P comes to assume a gelled state, the water barrier effect is enhanced. More specifically, in a case where a number of piles P are sunk in a row to form a retaining wall or the like, it is often desired that the retaining wall should provide a water barrier effect. When the method according to the present invention is used, this effect is fully manifested. Thus in some cases the object of this invention can be realized by applying a layer of the emulsion only to the grips.

There is no limit on the types of piles with which the method of this invention can be used. It can be applied not only to the U-section piles of the foregoing example, but also to Z-section piles, H-section piles, specially shaped piles, concrete piles and the like, and even to steel pipes, etc. Further, while the static-load driving method mentioned in the foregoing example is most preferable, the invention is not limited to this method and it is possible to select freely from such other driving and removing methods as the vibration method and the impact method.

TEST

A test conducted with respect to the pile driving method of the present invention will be explained.

(1) Nature of the test

The required amount of pressure measured in tons was compared between driving of U-section piles coated with emulsion according to this invention and ordinary pile driving.

Performance of the pile driver/extractor used:
Driving speed: 2.7–7.5 m/min
Extraction speed: 2.2–21.8 m/min
Piles used: U-section piles 10 m in length
Pile No. 1—Ordinary driving
Pile No. 2—Only bottom of pile coated with emulsion
Pile No. 3—Only bottom of pile coated over 3 m from tip
Pile No. 4—Pile sprayed with water over three meters from tip (2) Results of the test

| Depth (m) | Pressure in tons | | | | |
|---|---|---|---|---|---|
| | No. 1 | No. 2 | No. 3 | No. 4 | No. 4 (Second driving) |
| 1 | 8.7 | 11 | 11 | 13 | |
| 2 | 19 | 18 | 20 | 14.5 | |
| 3 | 9 | 10 | 22.5 | 10.5 | 8 |
| 4 | 10 | 10 | 11 | 12 | 8.5 |
| 5 | 16 | 11 | 12 | 16 | 8.5 |
| 6 | 37 | 18 | 21 | 45 | 10 |
| 7 | 47 | 20 | 29 | * | 36 |
| 8 | 56.5 | 26 | 36 | | 56.5 |
| 9 | 68 | 26 | 36 | | 69 |

* Driving became impossible

Although the emulsion used in this test was that according to Preparation Example 1, similar results were also obtained when this test was conducted using Preparation Examples (2), (3) and (4).

As shown by these results, in the piles coated with emulsion according to this invention, the surface frictional resistance was reduced during the driving operation so that the pile could be driven smoothly. Extraction could also be conducted smoothly. Further, when the surface of the piles were sprayed with water simultaneously with driving, results similar to those above were also obtained. Moreover, when the emulsions of the aforesaid Preparation Examples were injected into the ground, an even further reduction in frictional resistance was obtained.

Thus in accordance with the present invention, the frictional resistance between the surface of the piles and the surrounding earth is reduced during both driving and removal of piles and, moreover, the grips of the piles are imparted with a water barrier effect. The pile driving and removing operations can therefore be conducted most effectively.

What is claimed is:

1. In a method of driving a pile into the earth the improvement which comprises coating a water swellable polymer in a water-in-oil emulsion produced by emulsion polymerization of one or more water soluble vinyl monomers and a crosslinkable monomer, said emulsion having a particle size of 2 to 6$\mu$ on the surface of the pile, prior to driving said pile into the earth.

2. The method according to claim 1 wherein the emulsion polymerization is performed by preparing an aqueous solution of one or more soluble vinyl monomers and a crosslinkable monomer, emulsifying the aqueous solution in an organic solvent, using a hydrophobic surface active agent and thereafter, causing radical polymerization to proceed.

3. The method according to claim 1 wherein the emulsion further contains a hydrophilic surface active agent.

4. The method according to claim 1 which further comprises causing water to be present between the pile and the earth.

* * * * *